United States Patent Office 3,839,518
Patented Oct. 1, 1974

3,839,518
METHOD OF MAKING AND USING FOAM PLASTIC FROST BARRIER AND THERMAL INSULATION
Louis C. Rubens and Donald J. Sundquist, Midland, Mich., assignors to The Dow Chemical Company, Midland, Mich.
Filed Apr. 5, 1971, Ser. No. 130,944
Int. Cl. B29d 27/00; C08g 53/08
U.S. Cl. 264—45                                                 7 Claims

ABSTRACT OF THE DISCLOSURE

A plastic foam structure which is substantially water impermeable comprising particles of foamed thermocollapse resistant material such as partially cross-linked polystyrene foam securely bonded together in a matrix of solid binder such as asphalt. The plastic foam structure is made by mixing expandable beads in heated liquefied binder which supplies sufficient heat to foam the beads. The plastic foam structure is useful in constructions where a frost barrier is needed such as in road pavement and airport runway constructions or where thermal insulation is needed such as in pipeline and building constructions.

BACKGROUND OF THE INVENTION

(1) Field of the Invention

This invention relates to a moisture and thermal insulation barrier material useful in barrier and thermo-insulation constructions, with particular reference to a plastic foam structure comprising particles of foamed thermocollapse resistant plastic material securely bonded together in a matrix of solid binder, and methods of making and using the same.

(2) Description of the Prior Art

In general, it is well known that plastic foam materials such as polystyrene and polyurethane foam are useful as thermal insulation. There are also many known methods of preparing these plastic foams for use. For example, it has been established that installation of a thermal barrier under roadways is an effective way to eliminate the detrimental effects of seasonal frost formation. Effective use of plastic foam insulation in road constructions is well illustrated by U.S. Pat. No. 3,250,188, issued to G. A. Leonards. The presence of such a barrier reduces the design thickness required of non-frost susceptible base layers and eliminates the dimensional changes that can occur by preventing the penetration of the frost line into frost susceptible soil below the frost barrier layer. More recently, the use of plastic foam materials has been applied to earth insulation problems in permafrost regions where seasonal thawing of frozen frost containing soil must be prevented to eliminate breakup of surface constructions. As commonly practiced, boards of plastic foam are shipped to the construction site, placed on a graded surface and fastened in place with wooden skewers. One or more layers of non-frost susceptible material are usually spread over the plastic foam to protect the insulation layer from heavy loads and to provide a base for the wear resistant top surface. Plastic foam material is also used as conventional thermo-insulation in other constructions such as in pipeline, both above and below ground, and building constructions.

More recently, it has become obvious that there is need for a continuous foam-in-place system to minimize transportation and hand labor costs at construction sites. Another problem associated with many of the present plastic foam materials available is their susceptibility to the permeation of water which drastically reduces the insulating capacity of the same. This is particularly true where the construction incorporating the insulation material is in a wet soil environment. Present urethane foam earth insulation products exhibit an affinity to water due to their chemical composition. Water permeation into foam boards manufactured from expandable polystyrene beads is also a problem. Extruded polystyrene foam boards present less of a material water permeation problem but are still susceptible to water permeation through joints, seams and fasteners holes. An additional problem is noted in urethane foam-in-place systems in that they are based on a chemical reaction which is sensitive to variations in temperature, humidity, soil conditions, wind, etc., which greatly affect foaming behavior and preclude consistent results. Another problem in the present systems is a need for specially skilled installation personnel.

SUMMARY

In general, the present invention provides a plastic foam structure which is substantially water impermeable comprising particles of foamed thermocollapse resistant plastic material securely bonded together in a matrix of a solid binder. The particles have a initial unfoamed solid shape which may be geometrically regular such as a sphere and a cylinder or may be entirely irregular. As described in more detail later, the unfoamed particles must have two or more opposing outer surface portions which have a distance therebetween of about 0.6 to 4.0 millimeters with at least 90 percent of the thermocollapse resistant material forming the particles lying between the opposing outer surface portions. The solid binder substantially uniformly coats the outer surfaces of the foamed particles.

A novel method for making the plastic foam structure comprises mixing unfoamed particles of thermocollapse resistant material with heated liquefied binder, the heated binder supplying sufficient heat to cause the particles to foam. The particles are then foamed to a volume of at least 50 percent of their final volume during mixing to insure a substantially uniform coating of the binder on the outside surfaces of the particles. After the foaming particles and liquid binder have been mixed, they are formed into any desired shape. Thereafter, the foaming particles and liquid binder are restrained thereby causing the foaming particles to be securely bonded together in a matrix or binder. The restrained plastic foam structure is then cooled to a temperature at which the particles will not continue to foam and at which the liquid binder is transformed into an essentially solid state.

The mixing step of the method described above for making a plastic foam structure can be accomplished in a wide variety of mixing apparatus such as screw conveyors. It is usually necessary to include heating means in the apparatus to prevent cooling of the foaming particles to a temperature at which they will not continue to foam during the mixing step. As previously noted, the solid binder must be in a liquid state capable of substantially uniformly coating the outside surfaces of the particles at least during the time and at the temperatures required to foam the particles. The foaming temperatures for the particles varies from about 75° to 200° C.

It has been found that the plastic foam structure, described herein, is useful in a frost barrier construction exposed to an al fresco environment experiencing freezing conditions such as a pavement construction for vehicles or a runway construction for airplanes. Such frost barrier construction comprise a surface layer adapted as a load bearing and wear resistant surface and a second layer of the plastic foam structure located below the surface layer. There may or may not be additional layers of cohesionless non-frost susceptible material located between the surface layer and the layer of plastic foam structure to distribute normal surface loads evenly over the layer of plastic foam structure. The combined layers, including the layer of plastic foam structure, reduce the design thickness requirements for a frost barrier construction by substantially preventing frost penetration into a frost susceptible soil on which the layers rest thereby providing a frost free area in the soil below the layers. In permafrost regions where it is necessary to build a pavement or runway construction on a frozen frost containing soil, the combined layers are useful in substantially preventing heat penetration into the frozen frost containing soil thereby preventing the soil on which the frost barrier construction rests from thawing during warm climatic seasonal periods. The load bearing and wear resistant surface layer of a frost barrier construction can consist of any conventional materials such as asphalt, concrete or a mixture of glass fibers and polyester plastic material.

It has also been found that the plastic foam structure is useful in a thermo-insulation construction such as in a pipeline, both above and below ground, adapted to transport gaseous and liquid materials and in a building, more particularly in the foundation and basement wall and floor areas. In a thermo-insulation construction, the article to be insulated has a substantially continuous layer of the plastic foam structure disposed adjacent to at least a portion of one or more of its out surfaces. The layer will substantially reduce heat loss from the article.

Accordingly, this invention has among its objects the provision of a plastic foam structure useful in frost barrier and thermo-insulation constructions. Another object of this invention is the provision of a process for making a plastic foam structure. A further object of this invention is the provision of frost barrier and thermo-insulation constructions which include a layer of plastic foam structure. Yet additional objects and advantages of the present invention are even more apparent when taken in conjunction with the accompanying specification, drawings and claims.

BRIEF DESCRIPTION OF THE DRAWING

Referring to the accompanying drawings:

FIG. 1 is an isometric view of a layer of plastic foam structure showing particles of foamed thermocollapse resistant plastic material securely bonded together in a matrix of solid binder;

FIG. 2 is a cross-sectional view of a pavement construction with its base constructed according to the principles of the present invention;

FIG. 3 is an isometric view of a pipeline construction constructed according to the principles of the present invention;

FIG. 4 is a cross-sectional view of an airplane runway resting on a frozen frost containing soil and constructed according to the principles of the present invention; and FIG. 5 is a side elevation representation of an apparatus, without complete detail shown, used to form a layer of a plastic foam structure on graded frost susceptible soil.

DETAILED DESCRIPTION OF THE INVENTION

The following description illustrates the manner in which the principles of the invention are applied but are not to be construed as limiting the scope of the invention.

The plastic foam structure which can be utilized in frost barrier or thermo-insulation construction is substantially water impermeable. The water impermeable characteristic of the plastic foam structure is enhanced by the fact that it can be formed in a substantially continuous layer having a minimum of seams or joints through which water may permeate. The plastic foam structure has a compressive strength of at least 20 pounds per square inch at a five percent deflection and is capable of withstanding high impact and load bearing without crushing or destroying its useful purpose. The functional charatceristics of a frost barrier or thermo-insulation construction may be improved by placing at least one lamina adjacent and contiguous to one or more major surfaces of the layer of plastic foam structure. The lamina can be comprised of plastic film, metal foil, nonwoven fibrous material impregnated with a water resistant binder and the like. The foam structure has a weight ratio of about 65 weight percent of said particles or less and about 35 weight percent of said solid binder or more.

Thermocollapse resistant plastic materials useful in forming the foamable particles may be polystyrene, polystyrene copolymers, polymono-, or dichlorostyrene, polymono- or dichlorostyrene copolymers, and the like which have been partially cross-linked. The plastic material may be cross-linked with beta radiation with about 0.02 to 0.1 mole percent of a difunctional monomer such as divinylbenzene or glycol dimethylacrylate or with any other known means.

Generally, the thermocollapse resistance of the foamed particles herein described can be defined by their functional resistance to collapse when heated to a specific temperature for set periods of time. As herein defined thermocollapse resistance means that the particles of foamed plastic material should exhibit less than 10 percent volume collapse when heated to a temperature of 40° C. above the glass transition temperature of the plastic material in the foamed particles for a period of 30 minutes.

The cross-linking of the plastic materials herein described is another factor in determining the foam characteristics of particles formed therefrom. If the number of cross links is too low, the foamed particles will have poor thermocollapse resistance which will preclude their use in the present invention. If the number of cross links to too high, the particles will not foam sufficiently to be useful. The degree of cross-linking is herein defined by the equilibrium solvent swelling behavior of the above cross-linked polymers. To be useful in the present invention, the plastic materials should have an equilibrium swell in ambient room temperature toluene of from about 10 to 45 volumes. A detailed description of solvent swelling of cross-linked polymers can be found in an article entitled "Some Effects of Crosslinking Upon The Foaming Behavior of Heat Plastified Polystyrene," by L. C. Rubens, Journal of Cellular Plastics, April 1965, Vol. 1, No. 2.

The foamed particles are expanded with a blowing agent such as a low boiling aliphatic hydrocarbon, chlorofluorocarbon, and the like which is introduced into the unfoamed particles during their preparation. Small amounts of other comonomers such as acrylic or methacrylic acid, citraconic anhydride and the like may be added to increase the thermocollapse resistance of the particles.

The solid binder may be asphalt, rubber modified asphalt, epoxy resins and the like. Basic requirements of the binder are that it can be mixed with unfoamed particles without solvating or otherwise destroying the foamability of the particles and that it melts or is sufficienly liquid at the foaming temperatures of the particles to substantially uniformly coat the particles. The binder should also be substantially insoluble in water and otherwise resistant to water permeability and attack.

As previously noted, the unfoamed particles of thermocollapse resistant plastic material have at least two opposing outer surfaces wherein the thickness therebetween is about 0.6 to 4.0 millimeters and wherein 90 percent of the plastic material in the particle lies between these surfaces. It has been found that unless unfoamed particles having a minimum thickness for the major portion of foamable material of about 0.6 millimeters are used, the plastic foam structure herein described will partially collapse due to the temperatures and time required to form the same, irrespective of the use of a partially cross-linked plastic material in the particles. It has also been found that a maximum thickness of approximately 4.0 millimeters is the top practical limit for obtaining a usable plastic foam structure within a reasonable process time for the same. Partial collapse of the plastic foam structure causes voids to be formed in the collapsed areas which will then allow considerable water permeation into the structure. Water permeation into the structure severely reduces its insulating value and, therefore, can not be tolerated in frost barrier and thermo-insulation constructions.

Use of the plastic foam structure, herein described, in frost barrier and thermo-insulation constructions minimizes transportation costs and eliminates expensive hand labor installation techniques previously used. Foaming of the structure is based on physical changes involving the vaporization of liquid blowing agents in the particles. These physical changes are not significantly affected by variations in temperature, humidity, soil condition, wind, etc., as is the case with a system based on a chemical reaction. Furthermore, precise temperature control is not required. Additional advantages include inexpensive raw materials, nontoxic components and no need for special installation skills.

More specifically referring to FIG. 1, a layer of plastic foam structure 10, having partially cross-linked polystyrene foamed particles 14 securely bonded together in a matrix of solid asphalt binder 12 is illustrated. The asphalt binder 12 is a commercially available roofing grade asphalt. The partially cross-linked polystyrene foamed particles 14 are prepared from spherical expandable beads having an approximate diameter of 0.6 to 4.0 millimeters. The expandable beads were prepared by suspension polymerization from the following mixture:

|  | Wt. percent |
|---|---|
| Styrene monomer | 93.16 |
| Isopentane | 6.7 |
| Divinylbenzene | 0.05 |
| Peroxide catalysts | 0.09 |

The layer of plastic foam structure 10 was formed by placing a mixture of heated liquefied asphalt 12 and foaming particles 14 in a picture frame mold, foaming the same and then cooling the mixture to a temperature at which the particles 14 would not continue to foam and the asphalt binder 12 solidified. The method of preparing the plastic foam structure 10 will be hereinafter described in more detail.

Another plastic foam composite is illustrated in a copending application, Ser. No. 792,500 entitled "Foam Composite For Filling Enclosed Spaces," filed Jan. 21, 1969 by Louis C. Rubens and now U.S. Pat. 3,616,172. However, there is a critical difference between the plastic foam structure of the present invention and that of the copending application. This difference is represented by the thickness limitation of the foamable particles in the present invention. The critical difference is apparent when it is understood that little or no collapse which will result in voids in the plastic foam structure can be tolerated in the present invention, whereas partial collapse of the thin layered composite as it is taught in the copending application can be tolerated. Therefore, the limitation of the specific range of thickness is a necessary critical part of the present invention.

Referring now to FIG. 5, an apparatus 40, with only the critical details shown, for making a continuous layer of the plastic foam structure 10 is illustrated. The apparatus 40 has holding tanks 43 and 45 for expandable beads 42 and liquefied asphalt 46, respectively. The asphalt 46 is maintained in a heated condition by electric heating coils 56 at a temperature of 180° C. to 210° C. The expandable beads 42 are fed into a screw conveyor 44 through a tube 48 by gravity flow and the hot liquefied asphalt 46 is sprayed into the screw conveyor 44, as shown at 50. One or more screw conveyors 44 may be used depending on the desired width of layer 10. The screw conveyor 44 is driven by motor 52. The expandable beads 42 and the hot liquefied asphalt 46 are mixed in the screw conveyor 44 and advanced in the exit of the screw conveyor 44 where they are formed into a layer of plastic foam structure 10. The expanding beads 42 and the liquid asphalt 46 are maintained at a temperature of about 150° C. while in the screw conveyor 44. Heating coils 58 surround the screw conveyor 44 to help maintain the temperature of the mixture. The beads 42 are expanded into particles 14 having a volume of 80 to 90 percent of their final volume while in the screw conveyor 44 to insure a substantially uniform coating of the same with the asphalt 46. After a layer of plastic foam structure 10 is formed, it is restrained by a skid plate 54 to insure that the particles 14 will be securely bonded together in a matrix of the asphalt 46. Cooling of the layer of plastic foam structure 10 takes place while under the skid plate 54 thereby essentially terminating the foaming of the expanding particles 14 and solidifying the asphalt 46.

Referring now to FIGS. 2–4, examples of useful constructions incorporating a layer of plastic foam structure 10 are illustrated. Specifically, FIG. 2 shows a pavement construction with a layer of plastic foam structure 10 resting on a graded frost susceptible soil 15. A layer 16 of cohesionless non-frost susceptible sand or gravel is spread over layer 10 to form a subbase. A layer 18 of non-frost susceptible gravel is spread over layer 16 to form a base for a concrete or asphalt load bearing and wear resistant surface layer 20. The major surfaces 17 and 19 of the layer of plastic foam structure 10 can be covered with a plastic film or metal foil to enhance the water resistance or insulating characteristics of the same. FIG. 3 illustrates a pipeline construction having a pipe 22 substantially surrounded by a layer of plastic foam structure 10. The outer major surface of the layer of plastic foam structure 10 is wound with a strip 24 of plastic film or metal foil to enhance the water resistance or insulating characteristics of the same. FIG. 4 illustrates an airplane runway construction with a layer of plastic foam structure 10 resting on a graded frozen frost containing soil 15'. A layer 28 of non-frost susceptible sand or gravel is spread over layer 10 to form a base for the wear resistant and load bearing surface layer 26.

Representtaive physical properties of the plastic foam structure 10, including compressive strength, insulating factor and water pick-up, as compared with other more conventional insulating materials are shown in the following table I.

TABLE I

| Sample No.[1] | Foam particle density, lb./ft.$^3$ | Total density, lb./ft.$^3$ | Compressive strength[2] | K factor[3] | Water pickup[4] | | |
|---|---|---|---|---|---|---|---|
| | | | | | 10 days | 6 weeks | 12 weeks |
| 1 | 5.5 | 14.5 | 75.9 | | | Nil | 0.2 |
| 2 | 5.9 | 13.9 | 44.8 | | | 0.35 | 0.55 |
| 3 | 5.1 | 11.8 | 45.5 | | | 0.19 | 0.16 |
| 4 | 5.2 | 11.3 | 42.9 | | | 0.44 | 0.28 |
| 5 | 3.5 | 12.5 | | 0.306 | | | |
| 6 | 4.0 | 10.8 | | 0.280 | | | |
| 7 | 4.5 | 14.7 | | 0.305 | | | |
| 8 | 5.5 | 12.8 | | 0.288 | | | |
| 9 | 6.0 | 14.2 | | 0.318 | | | |
| 10 | 4.0 | 4.0 | | | | 1.1 | 1.43 |
| 11 | 3.5 | 3.5 | | | | 0.37 | 0.69 |

See footnotes at end of table.

TABLE I—Continued

| Sample No.[1] | Foam particle density, lb./ft.[3] | Total density, lb./ft.[3] | Compressive strength [2] | K factor [3] | Water pickup [4] | | |
|---|---|---|---|---|---|---|---|
| | | | | | 10 days | 6 weeks | 12 weeks |
| 12 | 3.0 | 3.0 | | | 0.50 | 1.27 | |
| 13 | 2.5 | 2.5 | | | 0.33 | 1.64 | |
| 14 | | | 50.0 | 0.208 | 0.27 | 0.34 | |
| 15 | 2.6 | 2.6 | 81.2 | | | 0.46 | |
| 16 | 2.5 | 295 | | 0.190 | | | |

[1] Samples 1–9 are lightly cross-linked polystyrene particles in an asphalt binder made according to present invention. Samples 10–13 are polystyrene foam bead boards made by conventional steam molding of expandable beads. Samples 14–16 are polystyrene foam boards made by a conventional extrusion process.
[2] Compressive strength is in units of pounds per square inch at a 5 percent deflection.
[3] K factor is in units of B.t.u./hr.-ft.$^2$-° F./in. (K factors of less than 0.4 are considered very satisfactory for frost barrier construction requirements).
[4] Water pickup data are in units of volume percent pickup (samples tested by submerging them in ambient room temperature water).

The application of the principles of the present invention can have a wide range of scope and are applicable to any type of frost barrier or thermo-insulation which can be improved by a highly water resistant thermal insulation barrier layer. While certain representative embodiments and details have been shown for the purpose of illustrating the invention, it will be apparent to those skilled in the art that various changes and modifications can be made therein without departing from the spirit and the scope of the invention.

What is claimed is:

1. A continuous method for forming a substantially water impermeable plastic foam structure useful in frost barrier and thermo-insulation constructions comprising:
    a. mixing particles of a foamable thermocollapse resistant plastic material with a liquid binder heated sufficiently to cause said particles to foam, said heated binder substantially uniformly coating the outside surface of said particles;
    b. continuously foaming said particles during said mixing to a volume of at least 50% of their final foamed volume;
    c. forming and restraining said foaming particles and liquid binder thereby causing said foaming particles to be securely bonded into a matrix of said binder; and
    d. cooling said restrained particles and liquid binder to a temperature at which said particles will not continue to foam and at which said liquid binder is transformed into essentially solid binder.

2. The method of Claim 1 wherein said thermocollapse resistant plastic material is partially cross-linked polystyrene which has an equilibrium swell in ambient room temperature toluene of from about 10 to 45 volumes.

3. The method of Claim 1 wherein said thermocollapse resistant plastic material is partially cross-linked poly-monochlorostyrene which has an equilibrium swell in ambient room temperature toluene of from about 10 to 45 volumes.

4. The method of Claim 1 wherein said particles have an initial unfoamed shape wherein two or more opposing outer surface portions thereof have a distance therebetween of about 0.6 to 4.0 millimeters and wherein at least 90 percent of said thermocollapse resistant material lies between said opposing surface portions.

5. The method of Claim 1 wherein said binder is selected from a group consisting of asphalt, rubber modified asphalt, epoxy modified asphalt and epoxy resins.

6. The method of Claim 1 wherein said mixing is accomplished in at least one screw conveyor.

7. The method of Claim 1 wherein said mixing step includes applying heat to prevent cooling of said foaming particles to a temperature at which the same will not continue to foam.

References Cited

UNITED STATES PATENTS

| | | | |
|---|---|---|---|
| 3,616,172 | 10/1971 | Rubens | 264—46 |
| 2,861,046 | 11/1958 | Stastny | 264—53 |
| 3,577,893 | 5/1971 | Towner | 106—41 |
| 3,561,334 | 2/1971 | Gerosa | 106—122 X |
| 2,865,800 | 12/1958 | Stastny | 264—46 |
| 2,994,327 | 8/1961 | Otto et al. | 264—47 XR |
| 3,336,184 | 8/1967 | Stastny et al. | 264—DIG 7 XR |
| 3,345,442 | 10/1967 | Oxel | 264—DIG. 7 XR |

OTHER REFERENCES

Inner Foam From Voraspan Beads—Dow Chemical Co., Midland, Mich.

H. S. COCKERAM, Primary Examiner

U.S. Cl. X.R.

52—411; 94—3, 7 X; 106—41, 122, 281; 161—162; 260—2.5 B; 264—47, DIG. 7